(12) United States Patent
Trubnikov et al.

(10) Patent No.: US 9,550,901 B2
(45) Date of Patent: Jan. 24, 2017

(54) INKJET PRINTING METHOD

(71) Applicant: Hewlett-Packard Industrial Printing LTD, Netanya (IL)

(72) Inventors: Alex Trubnikov, Petach Tiqwa (IL); Lior Lifshitz, Mevaseret Zion (IL); Yoav Bressler, Tel-Aviv (IL); Eytan Cohen, Raanana (IL); Danny Seidner, Netanya (IL)

(73) Assignee: Hewlett-Packard Industrial Printing LTD., Netanya (IL)

( * ) Notice: Subject to any disclaimer, the term of this patent is extended or adjusted under 35 U.S.C. 154(b) by 0 days.

(21) Appl. No.: 14/893,371

(22) PCT Filed: May 28, 2014

(86) PCT No.: PCT/IB2014/061778
§ 371 (c)(1),
(2) Date: Nov. 23, 2015

(87) PCT Pub. No.: WO2014/198827
PCT Pub. Date: Dec. 11, 2014

(65) Prior Publication Data
US 2016/0102219 A1   Apr. 14, 2016

(30) Foreign Application Priority Data
Jun. 3, 2013   (EP) .................................... 13170215

(51) Int. Cl.
*C09D 11/38* (2014.01)
*B41M 7/00* (2006.01)
(Continued)

(52) U.S. Cl.
CPC .............. *C09D 11/38* (2013.01); *B41J 11/002* (2013.01); *B41M 7/0081* (2013.01); *C09D 11/101* (2013.01); *C09D 11/322* (2013.01)

(58) Field of Classification Search
CPC ..... C09D 11/38; C09D 11/101; C09D 11/322; B41J 11/002; B41M 7/0081
See application file for complete search history.

(56) References Cited

U.S. PATENT DOCUMENTS 7,152,969 B2   12/2006   Hintermann
7,270,408 B2   9/2007    Odell et al.
(Continued)

FOREIGN PATENT DOCUMENTS

CN   101607470   12/2009
EP   1772498     4/2007
(Continued)

OTHER PUBLICATIONS

Corrall, "Effect of Print Resolution in Single-Pass Inkjet Printer Design", EBE Farm Vineyards Knapwell, 2008, 6 pages.
(Continued)

*Primary Examiner* — Stephen Meier
*Assistant Examiner* — Alexander D Shenderov
(74) *Attorney, Agent, or Firm* — Dierker & Kavanaugh, P.C.

(57) ABSTRACT

An inkjet printing method includes providing an inkjet composition, which includes a radiation curable monomer or oligomer, a photo-initiator, and an inhibitor present in an amount sufficient to prevent full curing of the radiation curable monomer or oligomer during an initial exposure to a curing energy. First drops of the inkjet composition are deposited onto a substrate. The curing energy is selected such that it is sufficient to substantially consume the inhibitor. The first drops are exposed to the curing energy, whereby the first drops retain substantially a same surface tension as a liquid drop of the inkjet composition. Second drops of the inkjet composition are deposited adjacent to the first drops. The first and second drops are exposed to the curing energy, (Continued)

whereby the first drops are at least partially cured and the second drops retain substantially the same surface tension as a liquid drop of the inkjet composition.

16 Claims, 3 Drawing Sheets

(51) Int. Cl.
*C09D 11/101* (2014.01)
*C09D 11/322* (2014.01)
*B41J 11/00* (2006.01)

(56) References Cited

U.S. PATENT DOCUMENTS

| | | | |
|---|---|---|---|
| 7,946,698 B2 | 5/2011 | Makuta et al. | |
| 7,950,795 B2 | 5/2011 | Ishikawa et al. | |
| 8,011,299 B2 | 9/2011 | Vosahlo | |
| 8,033,660 B2 | 10/2011 | Nakazawa et al. | |
| 2005/0027082 A1* | 2/2005 | Narayan-Sarathy | C08F 22/105 525/471 |
| 2006/0093798 A1* | 5/2006 | Daems | B41M 3/10 428/207 |
| 2006/0230969 A1* | 10/2006 | Vosahlo | B41J 11/002 101/488 |
| 2007/0129457 A1* | 6/2007 | Nakano | C09D 11/101 522/1 |
| 2007/0146431 A1* | 6/2007 | Nakamura | B41C 1/1066 347/52 |
| 2008/0096998 A1* | 4/2008 | Oyanagi | C09D 11/101 522/49 |
| 2010/0233448 A1* | 9/2010 | Kameyama | C09D 11/101 428/195.1 |
| 2010/0331478 A1* | 12/2010 | Claes | C09D 11/101 524/560 |
| 2011/0020562 A1* | 1/2011 | Fujisawa | B41J 11/002 427/487 |
| 2011/0060069 A1* | 3/2011 | Arora | C09D 11/101 522/64 |
| 2012/0069073 A1* | 3/2012 | Usuda | B41J 2/2114 347/14 |
| 2012/0281034 A1 | 11/2012 | De Meutter et al. | |

FOREIGN PATENT DOCUMENTS

| | | |
|---|---|---|
| EP | 1829682 | 9/2007 |
| EP | 1958788 | 8/2008 |
| EP | 2429828 | 2/2013 |
| WO | WO 2010/150023 | 12/2010 |

OTHER PUBLICATIONS

"No Slowing in the Inkjet Pace", Labels & Labeling, 2012, 5 pages, http://www.labelsandlabeling.com/news/features/no-slowing-in-the-inkjet-pace.

* cited by examiner

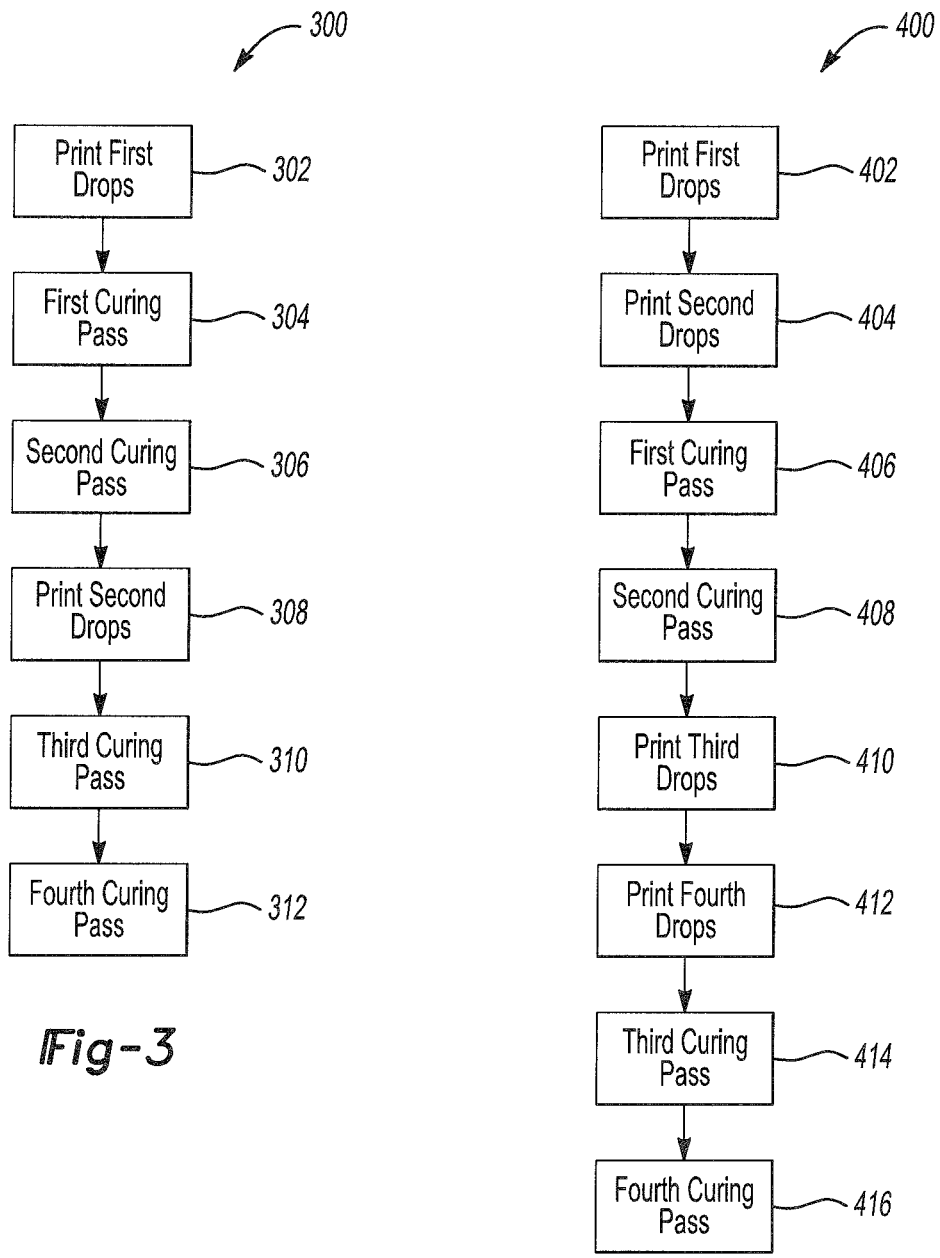

INKJET PRINTING METHOD

BACKGROUND

In addition to home and office usage, inkjet technology has been expanded to high-speed, commercial and industrial printing. Inkjet printing is a non-impact printing method that utilizes electronic signals to control and direct droplets or a stream of ink to be deposited on media. Current inkjet printing technology involves forcing the ink drops through small nozzles by thermal ejection or by piezoelectric pressure or oscillation onto the surface of the media. This technology has become a popular way of recording images on various media surfaces (e.g., paper), for a number of reasons, including, low printer noise, capability of high-speed recording and multi-color recording.

BRIEF DESCRIPTION OF THE DRAWINGS

Features and advantages of examples of the present disclosure will become apparent by reference to the following detailed description and the drawings, in which like reference numerals correspond to similar, though perhaps not identical, components. For the sake of brevity, reference numerals or features having a previously described function may or may not be described in connection with other drawings in which they appear.

FIG. 3 is a flow diagram illustrating another example of an inkjet printing method;

FIG. 4 is a flow diagram illustrating yet another example of an inkjet printing method;

DETAILED DESCRIPTION

Deposited and cured ink drops generally have a lower surface energy than a surface tension of liquid (i.e., wet) ink drops. It has been found that this difference contributes to the liquid ink drops having difficulty in wetting the cured ink drops. For example, the liquid ink drops may be pushed away from the cured drops during printing, which results in an image having white gaps formed between isolated domes of ink. This image may include a non-uniform layer of ink that is unable to achieve deep color and exhibits undesirably low gloss.

Examples of the inkjet composition disclosed herein enable wet on wet printing, which results in printed images that exhibit desirable print quality, color gamut, and gloss, as well as little or no white gaps between the cured drops. The ink compositions disclosed herein include an inhibitor that is present in an amount that is sufficient to prevent curing during the printing process. As an example, the amount of the inhibitor is sufficient to prevent full curing of the drop(s) in at least the initial curing step following the printing of the drop(s) on a substrate. As a result, in the methods disclosed herein, the previously deposited drops of the inkjet composition remain wet (i.e., retain the same surface tension as the liquid inkjet composition) when adjacent drops are deposited on the substrate. This reduces or eliminates undesirable effects discussed above that can result when wet drops are deposited onto or adjacent to dry (i.e., already cured) drops.

In the examples disclosed herein, the inkjet composition drops can exist in three phases over time, namely liquid, partially cured, or fully cured (i.e., solid). A liquid drop is capable of spreading (i.e., it substantially increases its area over time), while partially or fully cured drops do not spread. The surface tension or surface energy of a drop can be measured at any phase. It is to be understood that the liquid drop has substantially the same surface tension as the partially cured drop, but that the liquid drop and the solid drop have substantially different surface tensions. The surface tension (as measured in dyn/cm) of the partially cured drop (X) is between the surface tension of the cured drop (D) and the surface tension of the liquid drop (W). When $X<W+(D-W)*10\%$, partially curing has occurred, and the surface tension (X) is considered to be substantially the same as the surface tension (W). Alternatively, when $X>W+(D-W)*10\%$, curing has gone beyond partial curing, and thus the surface tension of the drop is no longer considered to be substantially the same as the surface tension (W) of the liquid drop.

Figure 1:
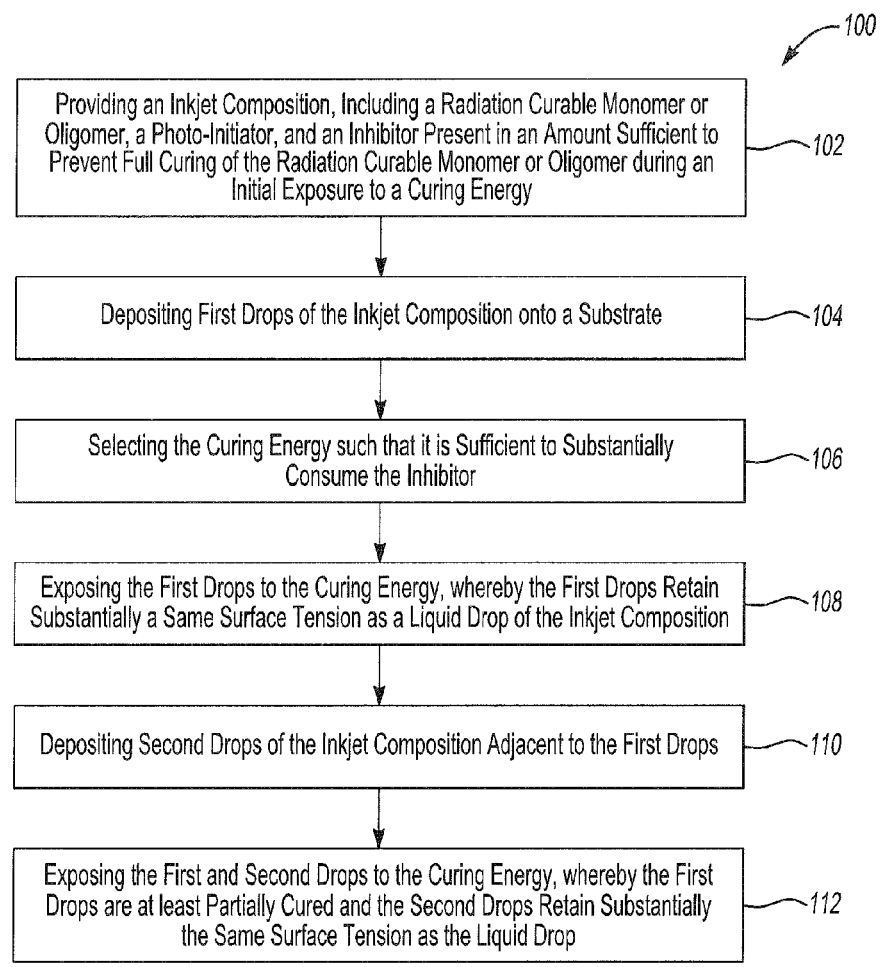
FIG. 1 is a flow diagram illustrating an example of an inkjet printing method.

Referring now to FIG. 1, an example of the printing method 100 is illustrated. At the outset of the method 100, an inkjet composition is provided, as shown at reference numeral 102. The inkjet composition may be an ink, which includes a colorant, or it may be a colorless varnish (e.g., used as a primer or overcoat), which does not include a colorant. Each of these examples will be discussed further below.

Whether provided as the ink or the colorless varnish, the inkjet composition includes a radiation curable monomer or oligomer, a photo-initiator, and the inhibitor.

The radiation curable monomer or oligomer may be any monomer or oligomer that cross-links when exposed to suitable radiation to form a hardened polymer. In an example, the radiation curable monomer or oligomer is an ultraviolet (UV) radiation curable monomer or oligomer. In other examples, the monomer or oligomer is curable with an electron beam or with visible light. Many cationic monomers or oligomers may be cured with the examples of radiation provided herein. The UV curable monomers or oligomers may be monofunctional or multifunctional; or a combination of monofunctional and multifunctional monomers or oligomers may be used. As examples, the monofunctional and/or multifunctional monomer or oligomer may be a (meth)acrylate monomer or a vinyl monomer.

Some examples of suitable monofunctional monomers include vinylcaprolactam, phenoxyethyl acrylate (PEA), isobornyl acrylate (IBOA), tetrahydrofurfuryl acrylate (THFA), 2-(2-ethoxyethoxy)ethyl acrylate, octadecyl acrylate (ODA), lauryl acrylate, 2-propenoic acid, 2(((butylamino) carbonyl)oxy)ethyl ester, and combinations thereof. When the monofunctional monomer or oligomer is used, it may be present in the inkjet composition in amount ranging from about 1 wt % to about 90 wt % of the total wt % of the inkjet composition. In another example, the monofunctional monomer or oligomer may be present in an amount ranging from about 30 wt % to about 50 wt %, based on the total weight of the inkjet composition.

Some examples of suitable multifunctional monomers include hexanediol diacrylate, trimethylolpropane triacrylate, pentaerythritol triacrylate, tetraethyleneglycol diacrylate, dipropyleneglycol diacrylate, tri(propylene glycol) triacrylate, neopentylglycol diacrylate, bis(pentaerythritol hexaacrylate), propoxylated neopentyl glycol diacrylate, ethoxylated trimethylolpropane triacrylate, and combinations thereof. When the multifunctional monomer or oligomer is used, it may be present in the inkjet composition in amount ranging from about 1 wt % to about 90 wt % of the total wt % of the inkjet composition. In another example, the multifunctional monomer or oligomer may be present in an amount ranging from about 5 wt % to about 20 wt %, based on the total weight of the inkjet composition.

The photoinitiator is an agent that initiates a reaction upon exposure to the wavelength of radiation that cures the monomer or oligomer that is included in the inkjet composition. As such, the photoinitiator selected will depend, at least in part, on the radiation curable monomer or oligomer that is selected. For example, if the radiation curable monomer or oligomer is UV curable, the photoinitiator will be a UV initiator.

The photoinitiator is present in an amount that is sufficient to cure the deposited inkjet composition after the inhibitor is consumed. In some examples, the photoinitiator is present in an amount ranging from about 0.01 wt % to about 10 wt % based on the total weight of the inkjet composition; and in other examples, the photoinitiator is present in an amount ranging from about 1 wt % to about 5 wt % based on the total weight of the inkjet composition.

It is to be understood that the photoinitiator may be a single compound or a mixture of two or more compounds. In some examples, the photoinitiator is a radical photoinitiator. Suitable examples of the radical photoinitiator include 1-hydroxy-cyclohexylphenylketone, benzophenone, 2,4,6-trimethylbenzo-phenone, 4-methylbenzophenone, diphenyl-(2,4,6-trimethylbenzoyl)phosphine oxide, phenyl bis(2,4,6-trimethylbenzoyl)phosphine oxide, 2-hydroxy-2-methyl-1-phenyl-1-propanone, benzyl-dimethyl ketal, 2-methyl-1-[4-(methylthio)phenyl]-2-morpholinopropan-1-one, or combinations thereof. An amine synergist may also be used as the photoinitiator in the examples disclosed herein. Examples of suitable amine synergists include ethyl-4-dimethylaminobenzoate and/or 2-ethylhexyl-4-dimethylamino benzoate.

As mentioned above, the inkjet composition also includes the inhibitor. In any of the examples disclosed herein, the inhibitor is present in the inkjet composition in an amount that is sufficient to prevent curing of the printed/deposited inkjet composition drops, at least during the initial exposure of the drops to curing energy/radiation after printing/deposition takes place. As used herein, the initial exposure may include a single curing pass or two consecutive curing passes. As examples, the method described in reference to FIG. 1 includes a single curing pass as the initial exposure, and the additional methods described in reference to FIGS. 3 and 4 include two consecutive curing passes as the initial exposure. If large amounts of inhibitor are included (e.g., 1.6 wt % or more), the initial exposure may include more than two curing passes.

In some instances, the amount of inhibitor prevents any curing (i.e., even partial curing) from taking place during the initial exposure of the drops to the curing energy after printing/deposition takes place. In other instances, the amount of initiator prevents full curing from taking place, but enables partial curing to take place, during the initial exposure of the drops to the curing energy after printing/deposition takes place. In still other instances, the amount of initiator prevents any curing from taking place during the initial exposure to the curing energy, and also at the outset of another exposure pass that immediately follows the initial exposure.

The inhibitor is an antioxidant or a direct radical scavenger (other than oxygen) that actually prevents radical polymerization of the curable monomer or oligomer upon initial exposure to the curing energy. During printing, oxygen can act as a radical scavenger to inhibit radical polymerization. In this regard, oxygen is consumed at the surface of a deposited drop until the ink composition cures and is also quickly replenished by diffusion in an oxygen rich atmosphere. The inhibitor is capable of increasing the effect of oxygen by capturing some of the radicals that are formed when the photoinitiator absorbs the curing energy. Therefore, the examples disclosed herein utilize the combined inhibitory effects of both the inhibitor and of oxygen. As such, the examples disclosed herein may be performed without an oxygen depletion unit (i.e., a mechanism that removes oxygen from the atmosphere during curing).

In the examples disclosed herein, the reaction of the inhibitor with the active radicals is much faster than the rate of radical formation, so polymerization does not proceed while any substantial amount of inhibitor (i.e., 0.4 wt % or more) is present in the deposited ink composition drops. The inhibitor is consumed through its interaction with the active radicals, and thus the curing energy indirectly consumes the inhibitor. As a result of being consumed, the inhibitor is transformed and loses its inhibitory properties. After consumption of almost all of the inhibitor, polymerization proceeds as rapidly as it does in the absence of the inhibitor. As such, the presence of the initiator in the examples disclosed herein contributes to maintaining the ink composition in liquid form (or at least having substantially the same surface tension as the liquid form) when adjacent drops are deposited.

Since the amount of inhibitor used is sufficient to prevent curing during the initial exposure, it is to be understood that the same curing energy may be used at each step of the methods disclosed herein. As such, maintaining the surface tension of the deposited drops after the initial disclosure (and possibly achieving partial curing) is achieved without lowering the radiation dose during one or more steps of the method. This is advantageous, at least in part, because system modifications do not have to be made in order to retain the liquid drop surface tension and to achieve better wetting between printed drops.

In addition to preventing curing as described herein, the amount of the inhibitor also stabilizes the inkjet composition during shipping and storage. It is believed that the amounts of inhibitor disclosed herein lead to at least a longer storage life compared to example compositions including very small amounts of inhibitor that do not prevent curing.

As mentioned above, the inhibitor is present in an amount that is sufficient to prevent curing of the printed/deposited inkjet composition drops, at least during the initial exposure of the drops to curing energy/radiation after printing/deposition takes place. In an example, this amount ranges from about 0.2 wt % to about 2 wt % of the total wt % of the inkjet composition. In another example, the amount of initiator ranges from about 0.4 wt % to about 1.2 wt % of the total wt % of the inkjet composition. For this particular range, the number of curing passes to fully cure the inkjet composition may range from 2 to 6. The amount of inhibitor may vary, depending upon whether the inkjet composition includes a colorant. Examples of the inkjet ink composition (which include colorant) may have less inhibitor than examples of the inkjet colorless varnish composition (which exclude colorant).

Also as mentioned above, the inhibitor may be an antioxidant or a direct radical scavenger. Examples of suitable inhibitors include nitro-compounds, nitroso-compounds, multinuclear aromatic hydrocarbons, metal salts, and/or nitroxyl piperidine radicals. One specific example of the inhibitor is tris(n-nitroso-n-phenylhydroxylamine)aluminum salt (NPAL), which is a direct radical scavenger.

When the inkjet composition is to be used as an ink, the composition also includes a colorant. The total amount of the pigment component in the inkjet ink composition ranges from about 2 wt % to about 4 wt % of the total weight of the inkjet ink composition.

The colorant may be a dispersible pigment, such as those commercially available from BASF Corp. under the tradenames PALIOTOL®, HELIOGEN®, CHROMOPHTAL®, IRGALITE®, and CINQUASIA®, those commercially available from Clariant under the tradenames HOSTAPERM® and NOVOPERM®, those commercially available from Sun Chemical Corp. under the tradenames SUNFAST® and QUINDO®, SPECIAL BLACK™ which is available from Evonik-Degussa GmbH, KRONOS® which are available from Kronos Worldwide, Inc., KEMIRA® which are available from Kemira Oyj.

The pigment may be any desirable color, including magenta, yellow, cyan, black, white, etc. Example pigments include PY (pigment yellow) 13, PY 83, PY 150, PY 151, PY 180, PY 213, PV (pigment violet) 19, PR (pigment red) 122, PR 184, PR 254, PB (pigment blue) 15:3, PB 15:4, PG (pigment green) 7, Carbon Black 7, and $TiO_2$ (a white pigment). Mixtures of different pigments may also be used.

When the inkjet composition is to be used as a colorless varnish, the composition does not include the colorant.

The inkjet ink composition and/or the inkjet colorless varnish composition may also include other additives to improve the properties and/or performance of the composition. Examples of suitable additives include de-foamers, polymerization stabilizers, surfactants, dispersing agents, and/or synergists.

As shown in FIG. 1 at reference numeral 102, after the inkjet composition is provided, first drops of the inkjet composition are deposited onto a substrate. In the examples disclosed herein, the substrate is any suitable solid ink-receiving material, such as coated and uncoated paper, plastic (e.g., polyvinyl chloride (PVC)), glass, wood planks, metals, a net or mesh made of plastic or rope, or any other solid object. In an example, the substrate is in the form of a flat surface or a sheet.

Figure 2:
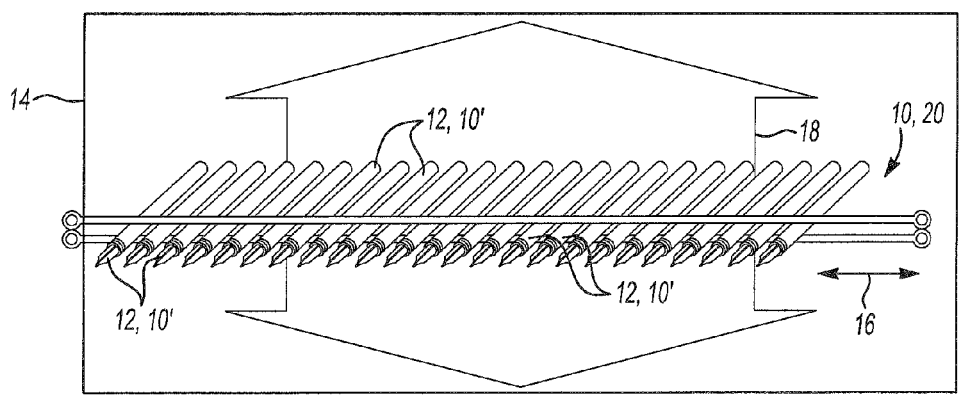
FIG. 2 is a schematic illustration of: a single printhead in which the pens schematically represent nozzles in the printhead; or a plurality of printheads in which each pen schematically represents a single printhead within the plurality, where the arrows represent movement of the printhead(s) relative to a substrate.

Depositing may be accomplished using multi-pass inkjet printing. FIG. 2 is a schematic representation of a multi-pass printhead 10 or an array 20 of multi-pass printheads 10'. It is to be understood that in the single multi-pass printhead 10, the pens represent nozzles 12 of the printhead 10. It is to be further understood that in the array 20, the pens represent individual printheads 10', each of which may contain a plurality of nozzles. In multi-pass inkjet printing, the printhead(s) 10, 10' is/are moving relative to a substrate 14 (e.g., from one end to another end across the width (represented by arrow 16) and/or length (represented by arrow 18) in several passes, or the substrate 14 is moved in a similar manner relative to stationary printhead(s) 10, 10'. In the example in which the array 20 includes multiple printheads 10', each printhead 10' may include the same or a different inkjet composition as/from that contained in any other printhead 10'. During each printing pass using the printhead 10 with a single row of nozzles 12, the inkjet composition may be deposited on the substrate 14 in a single row/line. Other printheads 10 include an array of nozzles 12, and one printing pass results in the inkjet composition being deposited on the substrate 14 in an array of parallel rows/lines. During each printing pass using the array 20, the inkjet composition may be deposited on the substrate 14 in a pattern that is dictated by the positioning of the printheads 10' and the nozzles within each of the respective printheads 10'.

It is to be understood that partial printing may occur in each row/line or each array of rows/lines several times until that row/line or array of rows/lines is fully printed. Partial printing may be useful when multiple colored inks are printed in the same row/line. In another example, the same row/line on the substrate 14 may be traversed several times, each time by a different nozzle, even when a single color or the same type of inkjet composition (e.g., varnish) is deposited. Some images to be printed may be sparse, and thus little or none of the inkjet composition may be deposited in one or more of the printing passes. As such, as used herein, depositing includes applying as little or as much of the inkjet composition in order to generate the desired image or to coat a desired image.

The printed image or colorless varnish layer is built up by successive printing passes of the printhead 10 or the array 20 across the substrate 14. In the example shown in FIG. 1, first drops may be deposited into one row/line on the substrate or into a plurality of parallel rows/lines on the substrate 14.

It is to be understood that a single colored inkjet ink composition or multiple colored inkjet ink compositions may be deposited in a single print job.

As shown at reference numerals 106 and 108 of FIG. 1, one example of the printing method disclosed herein involves selecting the curing energy and exposing the first drops to the selected curing energy. In the examples disclosed herein, the curing energy is radiation of a wavelength or within a range of wavelengths that is/are capable of curing the monomer or oligomer. The curing energy is selected so that during the initial curing pass following deposition of the inkjet composition drops, the inkjet composition drops would substantially cure (i.e., become a solid) if the initiator were not present. As such, a low dose of radiation is not utilized, and multiple different radiation sources (e.g., one suitable for partially curing and one suitable for full curing) are not utilized. More particularly, the curing energy is tuned to consume most, if not all, of the inhibitor present in the inkjet composition during the initial exposure following deposition of the inkjet composition drops. In this manner, when exposed to a subsequent curing pass, the deposited inkjet composition will at least partially, if not fully, cure.

A UV curable ink, such as, HP® FB225 cyan SCITEX ink (available from Hewlett Packard), can be fully cured with a UV dose which is on the order of 0.1 $J/(cm^2)$. The same amount of energy may be used as the curing energy disclosed herein. In an example, the curing energy may range anywhere from 0.1 $J/(cm^2)$ UV dose to 0.15 $J/(cm^2)$ UV dose.

As used herein, a curing pass is a sweep of the radiation source from one end of the substrate 14 to the other end of the substrate 14 across the width (noting that either the radiation source or the substrate 14 may be moved while the other of the two remains stationary). In the example of FIG. 1, the first curing pass is performed so that the previously deposited first drops are exposed to the curing energy.

The curing energy may be applied using any radiation source that is suitable for supplying the radiation that will cure the monomer or oligomer. In an example, the radiation source is a UV lamp. The radiation source may be located adjacent to the printhead 10, or to each printhead 10' in the array 20, or at one or more ends of the array 20, and may be activated at an appropriate time subsequent to the deposition of the inkjet composition onto the substrate 14. In the example shown in FIG. 1, the radiation source is activated after deposition of the first drops in order to expose the first drops to the radiation. In an example, the time between the deposition of the first drops and the exposure of the first drops to the curing energy is determined by the width of the substrate 14 and the speed of traversal across the substrate 14. In an example including a 3 m width and 1.5 m/s speed, the time between deposition and exposure is greater than 500 ms.

The curing energy applied during the initial curing pass after deposition of the inkjet composition drops works to consume the initiator present in the first drops. During this curing pass, the radiation applied is enough to substantially consume the inhibitor, but does not fully cure the inkjet composition. After the initial curing pass following deposition, the first drops are substantially free of inhibitor and remain wet (i.e., in liquid form or partially cured form, where the drop retains the surface tension substantially the same as the liquid form).

The example of the method 100 shown in FIG. 1 then involves the deposition of second drops of the inkjet composition adjacent to the first drops (reference numeral 110). It is to be understood that the terms "first" and "second" are being used to facilitate understanding, and that the first and second drops may be the same inkjet composition, may be different inkjet compositions, or may be combinations of various inkjet compositions (e.g., colors A and B printed in one row/line or array of rows/lines, and colors A, C, and D printed in the next row/line or next array of rows/lines).

When drops are deposited adjacent to one another, it is to be understood that the drops may be deposited in adjacent rows/lines or adjacent arrays of rows/lines, or directly on top of one another. When printed in adjacent rows/lines or adjacent arrays of rows/lines, minor overlap may occur between the first and second drops, at least in part because the drops are not rectangular and do not exactly tile the plane of the substrate 14. As such, the wet second drops are applied at least partially on the wet first drops. This wet on wet application enables the first and second drops to achieve desirable wetting and spreading, thereby reducing or eliminating white gaps between drops.

The deposition of the second drops may be accomplished in a single printing pass, or partial printing may occur in the row(s)/line(s) several times until the row(s)/line(s) of the second drops is/are fully printed.

After the second drops are deposited, the first and second drops are exposed to the curing energy, as shown at reference numeral 112 in FIG. 1. In an example, the time between the deposition of the second drops and the exposure of the second drops to the curing energy is greater than 500 ms. The time may vary, however, depending on the width of the substrate 14 and the speed of traversal across the substrate 14.

Since the inhibitor in the first drops is substantially consumed during the previous curing pass (reference numeral 108), curing of the first drops is initiated during this exposure step (reference numeral 112). In contrast, since the inhibitor is present in the second drops, the curing energy in this exposure step works to consume the initiator that is present in the second drops. During this curing pass then, the radiation applied is enough to i) at least partially cure the first drops, and ii) substantially consume the inhibitor in the second drops. It is to be understood that the curing energy applied during this step is not enough to cure the inkjet composition in the second drops. After this curing pass (which follows the deposition of the second drops), the first drops are at least partially cured, and the second drops are substantially free of inhibitor and remain wet (i.e., in liquid form or partially cured form, where the drop retains the surface tension substantially the same as the liquid form).

The method 100 shown in FIG. 1 may then include repeating the depositing and exposing steps until the desired image is printed.

The last row/line or array of parallel rows/lines of inkjet composition drops that is/are deposited and exposed to curing energy will remain liquid or partially cured since the inhibitor will be substantially consumed during that curing pass. As such, an additional (e.g., final) curing pass may be performed to cure the drops in last row(s)/line(s) of the image.

As shown in FIGS. 3 and 4, other examples of the method (reference numerals 300 and 400, respectively) may be performed. In one example of the method 300, a depositing step is followed by two consecutive steps of exposing the deposited drops to the curing energy (i.e., deposit/print, cure, cure, deposit/print, cure, cure . . . ). In another example of the method 400, two consecutive steps of depositing are followed by two consecutive steps of exposing the deposited drops to the curing energy (i.e., deposit/print, deposit/print, cure, cure, deposit/print, deposit/print, cure, cure . . . ). Of these two examples of the method, the former (method 300) may be a two radiation source (or lamp) mode (i.e., includes two lamps, both of which are tuned for the curing energy) and the latter (method 400) may be a one radiation source (or lamp) mode. In each of these methods 300, 400, the first and second curing passes immobilize the inkjet composition deposited in the immediately preceding depositing pass, but do not change the surface tension of the deposited drops. As such, in these examples, the initial exposure to the curing energy includes two curing passes (e.g., in FIG. 3, the initial exposure for the first drops includes the curing passes at steps 304 and 306). Any subsequent curing passes after the initial exposure works toward achieving full curing and a solid print.

Referring now specifically to FIG. 3, the inkjet composition (e.g., the same ink, different inks, and/or colorless varnish) is deposited as first drops in one row/line or an array of rows/lines during one pass of the printhead(s) (reference numeral 302). After a predetermined time period from the deposition of the first drops (which depends upon the speed of traversal), the first drops are exposed to two passes of the curing energy (reference numerals 304 and 306). In this example method, the amount of inhibitor in the first drops may be so high that the two curing passes together act as the initial exposure and provide sufficient curing energy to consume the inhibitor. As such, after the first and second curing passes, the first drops remain wet (i.e., liquid or partially cured).

The depositing step and the curing steps are repeated (as shown from reference numerals 308 through 312). For example, the inkjet composition is deposited as second drops in a row/line or an array of rows/lines that is/are adjacent to the row(s)/line(s) in which the first drops were deposited. After a predetermined time period from the deposition of the second drops, the first and second drops are exposed to two passes of the curing energy (reference numerals 310 and 312). In this example method 300, the first drops will at least partially cure since the inhibitor was previously consumed. Also in this example method 300, the amount of inhibitor in the second drops may be so high that the two curing passes together act as the initial exposure for the second drops, which provide sufficient curing energy to consume the inhibitor. As such, after the third and fourth curing passes, the second drops remain wet (i.e., liquid or partially cures).

This example of the method 300 may then include repeating the depositing step and the two consecutive exposing steps until the desired image is printed. The last row(s)/line(s) of inkjet composition drops that are deposited and exposed to the two curing passes will remain liquid or partially cured since the inhibitor will be substantially consumed but full curing will not occur during the two curing passes. As such, two additional curing passes may be performed to cure the drops in last row(s)/line(s) of the image.

Referring now specifically to FIG. 4, the inkjet composition (e.g., the same ink, different inks, and/or colorless varnish) is deposited as first drops in one row/line or an array of rows/lines during one pass of the printhead(s) 10, 10' (reference numeral 402) and then as second drops in an adjacent row/line or an adjacent array of rows/lines during another pass of the printhead(s) 10, 10' (reference numeral 404). After a predetermined amount of time from the printing of the first drops (which depends upon the substrate 14 width and the speed of traversal, and in one example is greater than 500 ms), the first and second drops are exposed to two passes of the curing energy (reference numerals 406 and 408). In this example method 400, the amount of inhibitor in the first and second drops may be so high that the two curing passes together act as the initial exposure for the first and second drops and provide sufficient curing energy to consume the inhibitor. As such, after the first and second curing passes, the first and second drops remain wet (i.e., liquid or partially cured).

As shown at reference numerals 410 through 416, the depositing steps and the curing steps are repeated. For example, the inkjet composition (e.g., the same ink, different inks, and/or colorless varnish) is deposited as third drops in a row/line or an array of rows/lines that is adjacent to the row(s)/line(s) in which the second drops are deposited (reference numeral 410), and as fourth drops in a row/line or an array of rows/lines adjacent to the row(s)/line(s) in which the third drops are deposited (reference numeral 412). After a predetermined amount of time from the printing of the third drops (again, which depends upon the substrate 14 width and the speed of traversal, and in one example is greater than 500 ms), the first, second, third and fourth drops are exposed to two passes of the curing energy (reference numerals 414 and 416). In this example method 400, the first and second drops will at least partially cure since the inhibitor was previously consumed. Also in this example method, the amount of inhibitor in the third and fourth drops may be so high that the two curing passes together provide sufficient curing energy to consume the inhibitor. As such, after the third and fourth curing passes, the third and fourth drops remain wet (i.e., liquid or partially cured).

This example of the method 400 may then include repeating the two consecutive depositing steps and the two consecutive exposing steps until the desired image is printed. The last rows/lines or arrays of rows/lines of inkjet composition drops that are deposited and exposed to the two curing passes will remain liquid or partially cured since the inhibitor will be substantially consumed during the two curing passes. As such, two additional curing passes may be performed to cure the drops in last rows/lines or arrays of rows/lines of the image.

The methods 100, 300, 400 disclosed herein result in images having relatively thin layers of the cured inkjet composition. The height of the relatively thin layer (measured from a surface of the substrate to a surface of the cured inkjet composition) may include up to three drops on top of one another. These thin layers are desirable so that vivid and exact color can be achieved (thicker layers may result in dull and non-exact colors due to saturation failing to increase and hue angles changing dramatically as thickness increases).

In the methods 100, 300, 400 disclosed herein, the number of printing and/or curing passes depends, at least in part, on the dimensions of the printhead(s) 10, 10' relative to the width and length of the image to be formed. For example, if the total width of the accumulated printhead(s) 10, 10' is shorter than the substrate width, then multiple passes are performed to cover the substrate width. If the width of the printhead(s) 10, 10' is sufficient to cover the substrate width, then the remaining factor is the spacing between nozzles 12 in any single printhead 10, 10' relative to the dimension of a drop. For example, if the spacing between nozzles 12 in a printhead 10 is 3 drops, then at least 3 passes are required to cover the substrate width, and if the accumulated width of the printhead 10 is half the width of the media, then at least 6 passes are required. In any of the examples disclosed herein, the number may range anywhere from a few passes (e.g., 3) up to tens or hundreds of passes.

In the examples disclosed herein, the number of curing passes to achieve full curing may be increased depending upon the amount of initiator used. As shown in Example 2 below, in some examples, the total number of curing passes to achieve full curing may range from 2 to 6.

Since curing is accomplished throughout the printing process, the impact of the examples of the method disclosed herein on throughput is minimal and additional radiation sources are not utilized. One additional curing step (or at most two as discussed above) may be used to achieve final curing. As such, depending upon the number of passes used during printing, anywhere from a 1% to a 50% decrease in throughput may result from using the example methods disclosed herein.

To further illustrate the present disclosure, examples are given herein. It is to be understood that these examples are provided for illustrative purposes and are not to be construed as limiting the scope of the present disclosure.

EXAMPLE 1

An inkjet ink composition was prepared according to the examples disclosed herein, and a comparative inkjet ink composition was prepared without an inhibitor. The compositions of the ink sample and the comparative ink sample are shown in Table 1.

TABLE 1

| Component name | Supplier | wt % Ink Sample | wt % Comparative Ink Sample |
|---|---|---|---|
| Octyl Decyl Acrylate | BASF | 25 | 25 |
| 2-Propenoic acid, 2-(((Butylamino)carbonyl)oxy)ethyl ester | RAHN | 25 | 25 |
| VinylCaprolactam | BASF | 16.1 | 16.1 |

TABLE 1-continued

| Component name | Supplier | wt % Ink Sample | wt % Comparative Ink Sample |
|---|---|---|---|
| IRGACURE ® 819 (Photoinitiator) | BASF | 3.3 | 3.3 |
| IRGACURE ® 907 (photoinitiator) | BASF | 1.1 | 1.1 |
| Tris(n-nitroso-n-phenyl-hydroxylamine)aluminum salt (NPAL) | FirstCure | 0.9 | 0 |
| Dipentaerythritol pentaacrylate | Sartomer | 6 | 6 |
| Propoxylated neopentyl glycol diacrylate | Sartomer | 19.6 | 20.5 |
| IRGALITE ® GLVO (Cyan pigment) | BASF | 2.1 | 2.1 |
| SOLSPERSE ® 32000 (dispersing agent) | Lubrisol | 0.7 | 0.7 |
| BYK ® 307 (surfactant) | BYK | 0.2 | 0.2 |

To test the performance of the ink sample and the comparative ink sample, a standard print engine was used. The print engine included a page-wide linear array of print heads with a nozzle density lower than the print resolution. An example of such a print engine is the flatbed printer HP FB7600. The print engine performed several print and cure sweeps along the substrate in order to fully print the image. In one sweep, the printheads fired, respectively, ink sample drops and comparative ink sample drops on the substrate, and then the printed area traveled under a UV lamp for exposure to curing energy. An additional curing sweep was performed for the ink sample. The resulting sample ink image and comparative ink sample image each included patches of solid ink, which were tested for density and gloss.

Density was measured using a densitometer (i1 Pro from X-Rite Inc.), and gloss was measured using a gloss meter at 60 degrees (Micro-TRI-Gloss gloss-meter from BYK-Gardner). The density and gloss measurements for the ink sample image and the comparative ink sample image are shown in Table 2.

TABLE 2

|  | Ink Sample Image | Comparative Ink Sample Image |
|---|---|---|
| Solid density | 1.64 | 1.25 |
| Solid gloss | 11 | 8 |

As illustrated in Table 2, the density and gloss of the ink sample image were better than the density and gloss of the comparative ink sample image.

Figure 5A:
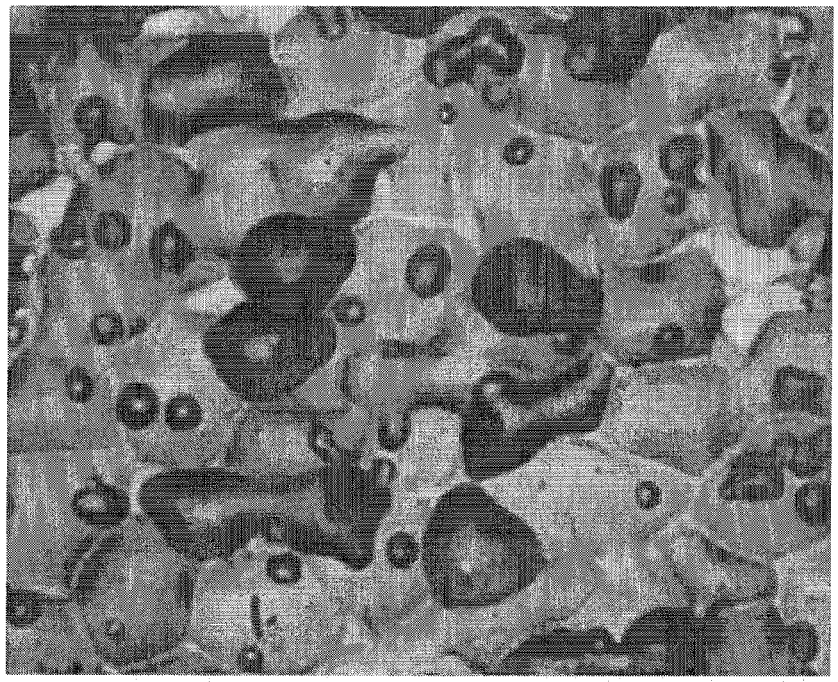
FIG. 5A is a con-focal microscope image of a print made with a comparative ink.
Figure 5B:
FIG. 5B is a con-focal microscope image of a print made with an example of the ink disclosed herein.

Images of the ink and comparative ink sample printed images were obtained using a con-focal microscope. These images are shown in FIGS. 5A and 5B, respectively. These images reveal that although the cured ink of the ink sample image keeps its size and shape, the drops are closer to one another and there are no white gaps between the drops. In contrast, white gaps exist between the cured drops of the comparative ink sample image. From FIGS. 5A and 5B, it can be concluded that better wetting is obtained with the ink sample and the method disclosed herein, which results in more uniform coverage, no white gaps and a flatter ink layer (which is macroscopically expressed as higher density and gloss, as shown in Table 2 above).

EXAMPLE 2

Several inks were prepared according to Example 1, each of which included a different amount (ranging from 0 wt % to 1.6 wt %) of the inhibitor tris(n-nitroso-n-phenylhydroxylamine)aluminum salt (NPAL). The amount of inhibitor used in each ink composition sample is shown in Table 3.

The curing speed of the ink composition samples was determined using LC6B bench top conveyer with Light Hammer 6 UV curing system (Fusion UV systems Inc., Gaithersburg, Md.). The ink composition samples were applied to a substrate by means of a draw down using a K Control Coater (RK Print Coat Instruments Ltd, Litlington, UK) in a thickness of 12 μm. Immediately after application, the ink composition was irradiated under the UV lamp at conveyer speed 360 ft/min (1.83 m/sec).

The cured ink film samples were tested with a S.A.M Hoffman Tester fitted with Gradco/Hoffman cutter. The blade of the Hoffman instrument was made of hardened tool steel formed into a cylindrical shape, with the axis of the cylinder held at 45 degrees by a beam carrying a sliding weight. The beam was attached through a hinge arrangement to a small four wheel trolley. Sufficient downward force on the trolley lifted the weight, which imposes a force on the cutter against the ink in proportion to the positioning of the weight on the beam. The trolley was then pulled across the cured ink film samples and the effect, if any, of the blade was observed. In this Example, the Hoffman Tester was used in the lower range of up to 250 grams loading.

The purpose of the test was to determine the maximum weight that can be used with the Tester without scratching the cured ink film samples at a given curing speed of the LC6B conveyer. The degree of curing at a certain conveyer speed is directly proportional to the maximum weight. The higher the supported weight, the better the results. Table 3 shows the number of curing passes performed in order for the resulting cured ink film sample to support the 250 g loading of the Hoffmann tester without scratch.

TABLE 3

| NPAL concentration in the respective ink composition samples, wt % | Number of irradiation/curing passes to support 250 g loading of Hoffmann tester without scratch (i.e., number of curing passes to achieve full curing) |
|---|---|
| 0 | 1 |
| 0.1 | 1 |
| 0.4 | 2 |
| 0.8 | 4 |
| 1.2 | 6 |
| 1.6 | Fails even after 15 passes |

The results shown in Table 3 indicate that without NPAL, the cured ink film sample was not scratched when 250 g weight is applied after 1 irradiation pass. As such, a single curing pass cured the ink composition that did not contain the NPAL inhibitor. After adding NPAL in an amount greater than 0.1 wt %, the same weight was supported only when the number of curing passes was increased. As such, these results indicate that the increased amount of inhibitor prevents full curing in at least the initial curing pass, thus enabling wet on wet printing to be achieved.

It is to be understood that the ranges provided herein include the stated range and any value or sub-range within the stated range. For example, a range from about 1 wt % to about 90 wt % should be interpreted to include not only the explicitly recited limits of about 1 wt % to about 90 wt %, but also to include individual values, such as 15 wt %, 33 wt %, 78 wt %, etc., and sub-ranges, such as from about 10 wt % to about 80 wt %, from 25 wt % to about 75 wt %, etc.

Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it will be apparent to those skilled in the art that the disclosed examples may be modified. Therefore, the foregoing description is to be considered non-limiting.

What is claimed is:

1. An inkjet printing method, comprising:
providing an inkjet composition, including:
a radiation curable monomer or oligomer;
a photo-initiator; and
an inhibitor present in an amount sufficient to prevent full curing of the radiation curable monomer or oligomer during an initial exposure to a curing energy;
depositing first drops of the inkjet composition onto a substrate;
selecting the curing energy such that it is sufficient to substantially consume the inhibitor;
exposing the first drops to the curing energy, whereby the first drops retain substantially a same surface tension as a liquid drop of the inkjet composition;
depositing second drops of the inkjet composition adjacent to the first drops; and
exposing the first and second drops to the curing energy, whereby the first drops at least partially cure and the second drops retain substantially the same surface tension as the liquid drop.

2. The inkjet printing method as defined in claim 1, further comprising exposing the first and second drops to the curing energy, thereby at least partially curing the second drops.

3. The inkjet printing method as defined in claim 2 wherein a total number of curing passes to which each of the first and second drops is exposed ranges from 2 to 6.

4. The inkjet printing method as defined in claim 1 wherein the inhibitor is selected from the group consisting of nitro-compounds, nitroso-compounds, multinuclear aromatic hydrocarbons, metal salts, and nitroxyl piperidine radicals, and is present in an amount ranging from about 0.2 wt. % of a total wt. % of the inkjet composition to about 2 wt. % of the total wt. % of the inkjet composition.

5. The inkjet printing method as defined in claim 1 wherein the depositing and exposing steps are performed according to a multi-pass method.

6. The inkjet printing method as defined in claim 1 wherein the inkjet printing method is performed without an oxygen depletion unit.

7. The inkjet printing method as defined in claim 1 wherein:
a time between the depositing of the first drops and the exposing of the first drops is greater than 500 ms; and
a time between the depositing of the second drops and the exposing of the second drops is greater than 500 ms.

8. The inkjet printing method as defined in claim 1 wherein:
providing the inkjet composition includes providing a first inkjet composition of a first color and a second inkjet composition of a second color;
the first drops are of the first inkjet composition; and
the second drops are of the second inkjet composition.

9. The inkjet printing method as defined in claim 1 wherein the amount of the inhibitor is sufficient to prevent any curing of the radiation curable monomer or oligomer during the first exposure to the curing energy.

10. The inkjet printing method as defined in claim 1 wherein one of:
the inkjet composition further includes a colorant; or
the inkjet composition is a colorless varnish that excludes a colorant.

11. An inkjet printing method, comprising:
providing an inkjet composition, including:
a radiation curable monomer or oligomer;
a photo-initiator; and
an inhibitor present in an amount sufficient to inhibit curing of the radiation curable monomer or oligomer during an initial exposure to a curing energy;
selecting the curing energy so that it is sufficient to consume some of the inhibitor in printed drops of the inkjet composition;
printing first drops of the inkjet composition on a substrate in a first printing pass;
exposing the first drops to the curing energy in a first curing pass and a second curing pass, wherein the first drops retain substantially a same surface tension as a liquid drop of the inkjet composition after the first and second curing passes;
printing second drops of the inkjet composition adjacent to the first drops in a second printing pass; and
exposing the first and second drops to the curing energy in a third curing pass and a fourth curing pass, wherein the first drops at least partially cure and the second drops retain the same surface tension as the liquid drop of the inkjet composition after the third and fourth curing passes.

12. The inkjet printing method as defined in claim 11, further comprising:
depositing third drops adjacent to the first drops before exposing the first drops to the curing energy, wherein the exposing of the first drops to the curing energy also includes exposing the third drops to the curing energy; and
depositing fourth drops adjacent to the second drops before exposing the first and second drops to the curing energy, wherein the exposing of the first and second drops to the curing energy also includes exposing the third and fourth drops to the curing energy.

13. The inkjet printing method as defined in claim 11, further comprising exposing the first, second, third, and fourth drops to a final curing pass to ensure curing of all of the drops.

14. The inkjet printing method as defined in claim 11 wherein:
the depositing and exposing steps are performed with a multi-pass inkjet printhead; and
the inkjet printing method is performed without an oxygen depletion unit.

15. An inkjet composition, comprising:
a radiation curable monomer or oligomer including:
  a plurality of monofunctional monomers or oligomers present in a total amount of between 59.4 and 72.6 wt % of a total weight of the inkjet composition; and
  a plurality of multifunctional monomers or oligomers present in a total amount of between 22.5 and 27.5 wt % of the total weight of the inkjet composition;
a photo-initiator; and
an inhibitor present in an amount ranging from 0.4 wt % of a total weight of the inkjet composition to about 1.2 wt % of the total weight of the inkjet composition to prevent full curing of the radiation curable monomer or oligomer during an initial exposure to a curing energy;
wherein the inhibitor is selected from the group consisting of nitro-compounds, nitroso-compounds, multinuclear aromatic hydrocarbons, metal salts, nitroxyl piperidine radicals, and combinations thereof.

16. The inkjet composition as defined in claim 15 wherein the inhibitor is tris(n-nitroso-n-phenylhydroxylamine)aluminum salt (NPAL).

\* \* \* \* \*